United States Patent [19]

Nishimukai et al.

[11] Patent Number: 4,912,635
[45] Date of Patent: Mar. 27, 1990

[54] SYSTEM FOR REEXECUTING BRANCH INSTRUCTION WITHOUT FETCHING BY STORING TARGET INSTRUCTION CONTROL INFORMATION

[75] Inventors: Tadahiko Nishimukai, Sagamihara; Atsushi Hasegawa, Koganei; Kunio Uchiyama, Kokubunji; Yoshifumi Takamoto, Totsuka, all of Japan

[73] Assignees: Hitachi, Ltd.; Hitachi Microcomputer Engineering, Ltd., both of Tokyo, Japan

[21] Appl. No.: 151,276

[22] Filed: Feb. 1, 1988

Related U.S. Application Data

[63] Continuation of Ser. No. 699,688, Feb. 11, 1985, abandoned.

[30] Foreign Application Priority Data

Feb. 10, 1984 [JP] Japan ................................. 59-21794

[51] Int. Cl.⁴ .............................................. G06F 9/30
[52] U.S. Cl. ................................. 364/200; 364/261.5; 364/262.253.1; 364/254.8
[58] Field of Search ... 364/200 MS File, 900 MS File

[56] References Cited

U.S. PATENT DOCUMENTS

| | | | |
|---|---|---|---|
| 3,559,183 | 1/1971 | Sussenguth | 364/200 |
| 3,940,741 | 2/1976 | Horikoshi et al. | 364/200 |
| 4,477,872 | 10/1984 | Losq et al. | 364/200 |
| 4,566,063 | 1/1986 | Zolnowsky et al. | 364/200 |
| 4,594,659 | 6/1986 | Guenthner et al. | 364/200 |
| 4,604,691 | 8/1986 | Akagi | 364/200 |
| 4,626,988 | 12/1986 | George | 364/200 |

FOREIGN PATENT DOCUMENTS 56-123041 9/1981 Japan .
59-20049 2/1984 Japan .

*Primary Examiner*—Thomas C. Lee
*Attorney, Agent, or Firm*—Antonelli, Terry & Wands

[57] ABSTRACT

The present invention relates to a pipeline data processing apparatus wherein an instruction is fetched from a main storage, the instruction is decoded to generate control information for executing the instruction, and the control information is transferred to an instruction execute circuit. The target address of a branch instruction is stored in the index field of an associative memory, and control information obtained by decoding a target instruction of branch corresponding to the branch instruction is stored in the data field of the associative memory beforehand. When executing the branch instruction, the associative memory is accessed with the target address, and the control information of the corresponding entry is read out and is transferred to the instruction execute circuit, whereupon the instruction execute circuit starts executing the target instruction of branch instruction in succeession to the execution of the branch instruction.

32 Claims, 8 Drawing Sheets

SYSTEM FOR REEXECUTING BRANCH INSTRUCTION WITHOUT FETCHING BY STORING TARGET INSTRUCTION CONTROL INFORMATION

This is a continuation application of Ser. No. 699,688, filed Feb. 11, 1985, now abandoned.

BACKGROUND OF THE INVENTION

The present invention relates to an instruction control system, and more particularly to a data processing apparatus which can shorten the branch instruction executing time of a microprocessor employing a pipeline control system.

As shown in FIG. 1, a data processing apparatus 1 comprises, in general, an interface circuit 4 which exchanges data with a main storage 5, an instruction control unit 2 which controls an instruction to be executed, and an instruction execute unit 3 which executes the instruction. When an instruction fetched from the main storage 5 is transmitted to the instruction control unit 2 via the interface circuit 4, the instruction control unit 2 decodes the transmitted instruction and transmits the decoded result to the instruction execute unit 3. According to the decoding, the instruction execute unit 3 generates various control signals, which enable or disable gates within the instruction execute unit 3 so as to perform the processes of operations, storage, shift, etc. The instruction control unit 2 commands the main storage 5 through the interface circuit 4 to fetch the next instruction. By repeating such series of operations, the data processing apparatus 1 runs a program stored in the main storage 5.

In this data processing apparatus, the interface circuit 4, instruction control unit 2 and instruction execute unit 3 can operate in parallel with one another, and the pipeline control is made.

Referring to FIG. 2, an instruction ① is fetched from the main storage 5 by the interface circuit 4 in two cycles $T_1$ and $T_2$, and it is decoded by the instruction control unit 2 in a cycle $T_3$. The next instruction ② is fetched from the main storage 5 by the interface circuit 4 in two cycles $T_3$ and $T_4$.

Meanwhile, the instruction ① decoded in the cycle $T_3$ executed by the instruction execute unit 3 in two cycles $T_4$ and $T_5$. Since the fetch of an instruction ③ is started and the instruction ② is decoded in the cycle $T_5$, the instruction execute unit 3 executes the instruction ② in cycles $T_6$ and $T_7$ without any idle time. In this manner, the pipeline control makes it possible to shorten the execution time per instruction.

However, in a case where a branch instruction has been executed midway of the series of processes, a target address of branch is determined for the first time after the execution of the instruction. As shown in FIG. 3, therefore, an idle time of 4 cycles arises after the execution of a branch instruction ① until a target instruction of branch ⑩ is executed.

In this manner, with the prior-art data processing apparatus of the pipeline control type, the execution of the branch instruction renders the parallel processing impossible during the corresponding period, and the effect of the pipeline control is not demonstrated, so that degradation in performance is incurred.

In order to decrease the drawback, there has heretofore been often employed a method wherein a copy of some of the instructions stored in the main storage 5 is held in a cache memory of high speed and small capacity disposed in the data processing apparatus 1, and in the presence of a target instruction of branch in the cache memory, the instruction is fetched therefrom. whereby the period of time for fetch from the main storage 5 is shortened.

Also, there is often employed a method wherein an address computing circuit is disposed in the instruction control unit 2, and before the completion of the execution of a branch instruction in the instruction execute unit 3, a target address of branch is computed and is used for fetching a target instruction of branch, thereby to shorten the branch instruction processing time. With this method, as shown in FIG. 4, after a branch instruction ① has been decoded, a target address of branch is computed in parallel with the execution of the instruction ① by the address computing circuit. Therefore. a target instruction of branch ⑩ can be fetched in two cycles $T_5$ and $T_6$. In FIG. 4, the delay of processing in the case of the branch decreases to two cycles.

Since, however, this method is premised on the execution of branch, a needless instruction is fetched as shown in FIG. 5 when the condition of a conditional branch instruction is not met. Moreover, in order to perform the address computation within the instruction control unit 2, information necessary therefor must be gained from the instruction execute unit 3. This leads to a complicated arrangement, and also to an increase in the number of wiring lines, etc. which lower the density of integration when the circuits are packaged in an LSI. Accordingly, the method is unsuitable for a microprocessor etc. requiring the LSI implementation.

With a general-purpose computer or the like, a large number of signal lines can be laid between the main storage 5 and the interface circuit 4, and the quantity of data which can be simultaneously transmitted is large. so that the fetching of one instruction is completed in one cycle as shown in FIG. 6. Therefore, even in the case where the condition of the conditional branch instruction is not met, an instruction required in this case is already fetched at a high possibility at a point of time before the fetching of the target instruction of branch is started, and the needless fetching seldom degrades the performance. However, with the microprocessor or the like in which the data transmission throughput cannot be increased on account of limitation to the number of input/output pins, one instruction cannot be fetched in one cycle, and hence, the performance is degraded.

Heretofore, in order to fetch target instructions of a branch instruction at high speed. an apparatus has been proposed wherein the target instructions of a branch instruction are stored in an associative memory beforehand, and when an instruction is decoded, whether or not it is a branch instruction to hold is predictively checked using an instruction address as an access input. and the corresponding target instruction is output (refer to Japanese Patent Application Publication No. 54-945 corresponding to U.S. Pat. No. 3,940,741). The apparatus, however, shortens only the fetch time of the target instruction of a branch instruction and has the disadvantage that the subsequent instruction decoding time is not shortened.

SUMMARY OF THE INVENTION

According to the present invention, in order to shorten a branch instruction execution time, the addresses of branch instructions are stored in an index field of an associative memory, while control information obtained by decoding target instructions of the anch instructions are stored in the data field of the associative memory beforehand; when the branch instruction is executed, the associative memory is accessed by the branch instruction address, and control formation of the target instruction stored in the corresponding entry is read out and is transmitted to an instruction execute circuit; and the instruction execute rcuit starts executing the target instruction in succession to the execution of the branch instruction.

DESCRIPTION OF THE PREFERRED EMBODIMENTS

Figure 1:
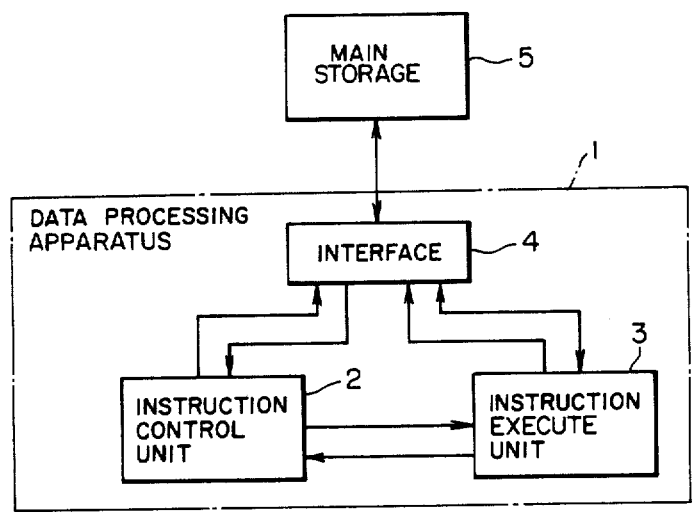
FIG. 1 is a general block diagram of a data processing apparatus.
Figure 2:
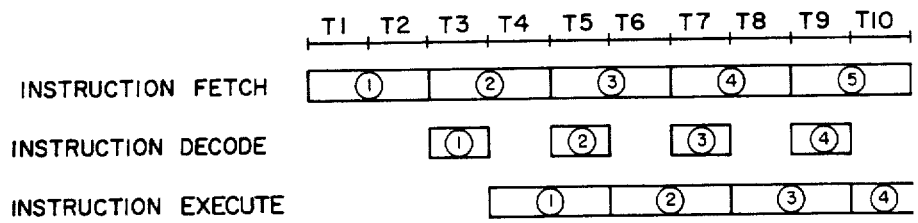
FIGS. 2, 3, 4, 5 and 6 are time charts of instruction processes in the prior art.
Figure 3:
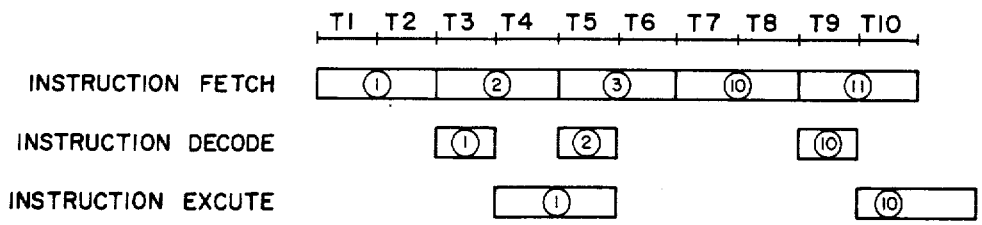
Figure 4:
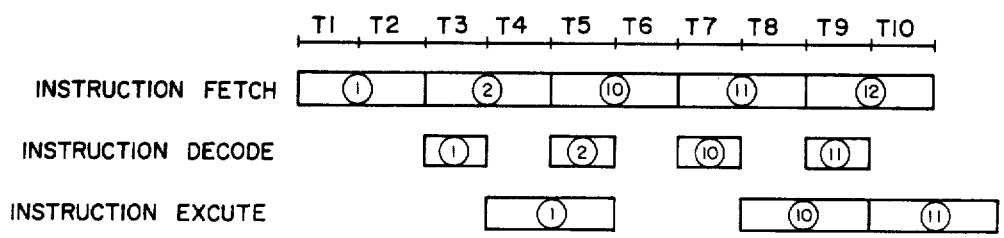
Figure 5:
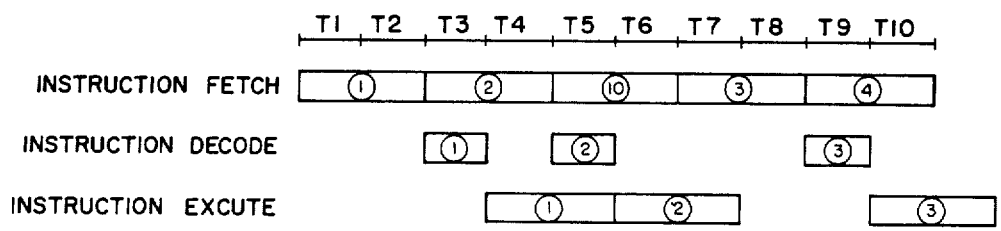
Figure 6:
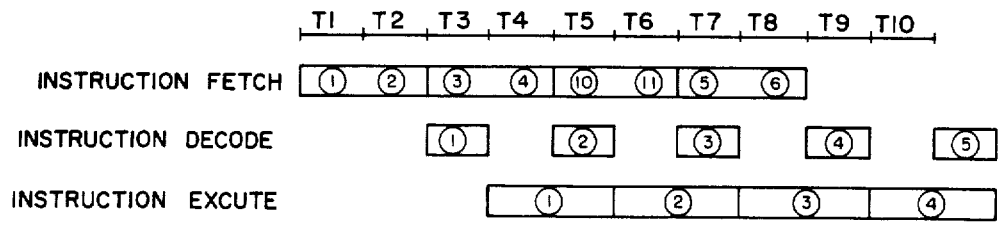
Figure 7:
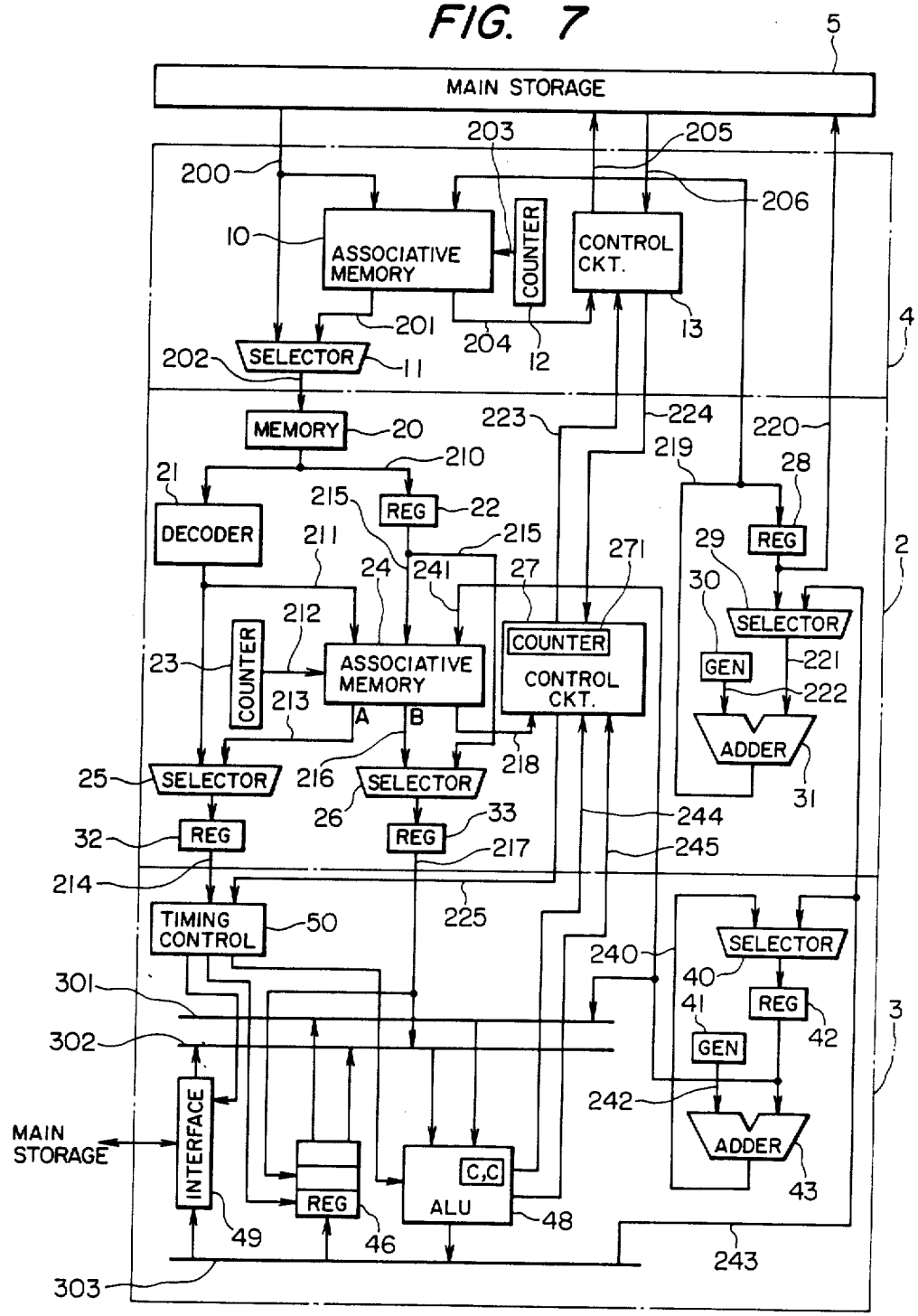
FIG. 7 is a block diagram of a data processing apparatus showing an embodiment of the present invention.

In FIG. 7, only the essential portions of an interface circuit 4, an instruction control unit 2 and an instruction execute unit 3 are shown. Numeral 21 designates an instruction decoder which decodes the various types of instructions. Numerals 10 and 24 designate associative memories, numerals 11, 25, 26, 29 and 40 selectors, numerals 12 and 23 counters, and numerals 22, 28, 32, 33 and 42 registers. Shown at numeral 20 is a first-in first-out memory from which data having entered first is read out first, the read out data being erased. Numeral 30 indicates a constant generator circuit, numerals 31 and 43 adders, and numeral 41 an instruction length register. The interface circuit 4 has a control circuit 13, while the instruction control unit 2 has a control circuit 27. Numeral 46 denotes a large number of general-purpose registers, numeral 48 an ALU, numeral 49 an interface circuit, and numeral 50 a timing control circuit. Numerals 301, 302 and 303 denote data buses.

Also in FIG. 7, a signal 200 is instruction data fetched from a main storage 5, a signal 201 is instruction data fetched from the associative memory 10, a signal 202 is instruction data fetched from either the main storage 5 or the associative memory 10, a signal 203 is an entry number signal for writing an instruction into the associative memory 10, a signal 204 is a signal indicating whether or not the corresponding entry is stored in the associative memory 10, a signal 205 is an instruction fetch request signal to the main storage 5, and a signal 206 is an instruction fetch end signal from the main storage 5.

A signal 210 is instruction data fetched from the memory 20, a signal 211 is the decoded result of an instruction, a signal 212 is the entry number of the associative memory 24, a signal 213 is the decoded result of an instruction fetched from the associative memory 24, a signal 214 is the decoded result of an instruction provided as an output from either the instruction decoder 1 or the associative memory 24, a signal 215 is instruction data latched in the register 22, a signal 216 is instruction data fetched from the associative memory 24, a signal 217 is instruction data fetched from either the register 22 or the associative memory 24, a signal 218 is a signal indicating whether or not the corresponding entry is stored in the associative memory 24, signals 219 and 220 are the address of instruction data to be fetched next, a signal 221 is an address which is used for computing the address of the instruction data to be fetched next, a signal 222 is a signal which assumes '0' or '1', a signal 223 is an instruction fetch request signal, a signal 224 is an instruction fetch end signal, and a signal 225 is an instruction execute inhibit signal.

A signal 241 is the address of an instruction to be executed, a signal 242 is a signal whose value is the word length of the instruction, a signal 243 is a target address of branch, a signal 244 is the next instruction request, and a signal 245 is a branch signal indicating that the branch ought to be done.

In such arrangement, the address of an instruction to be fetched next is computed by the register 28, selector 29, constant generator circuit 30 and adder 31.

The address of the first word of an instruction to be executed by the instruction execute unit 3 is computed by the selector 40, constant generator circuit 41, register 42 and adder 43.

The associative memory 10 has data written in a position which is specified by an entry number held in the counter 12. This counter 12 counts up the entry number automatically when an input is written into the associative memory 10. After the associative memory 10 has been filled with all its entries, the oldest entry is erased, and new data is written.

Similar to the associative memory 10, the associative memory 24 has data written in an entry number specified by the counter 23 which counts in the same manner as the counter 12.

The control circuit 27 includes a counter 271 therein. The counter 271 serves to store the number of instructions which are stored in the memory 20. The control circuit 27 outputs the instruction fetch request 223 to the control circuit 13 until the content of the counter 271 reaches a certain value, in other words, when the memory 20 has an empty area.

The general-purpose registers 46 function so that the data of the general-purpose register specified by the instruction data 217 is provided as an output or that data on the data bus 303 is received into the general-purpose register specified by the instruction data 217.

In a case where data stored in the main storage 5 is necessary for the execution of an instruction, the interface circuit 49 serves to read out the data.

Figure 8:
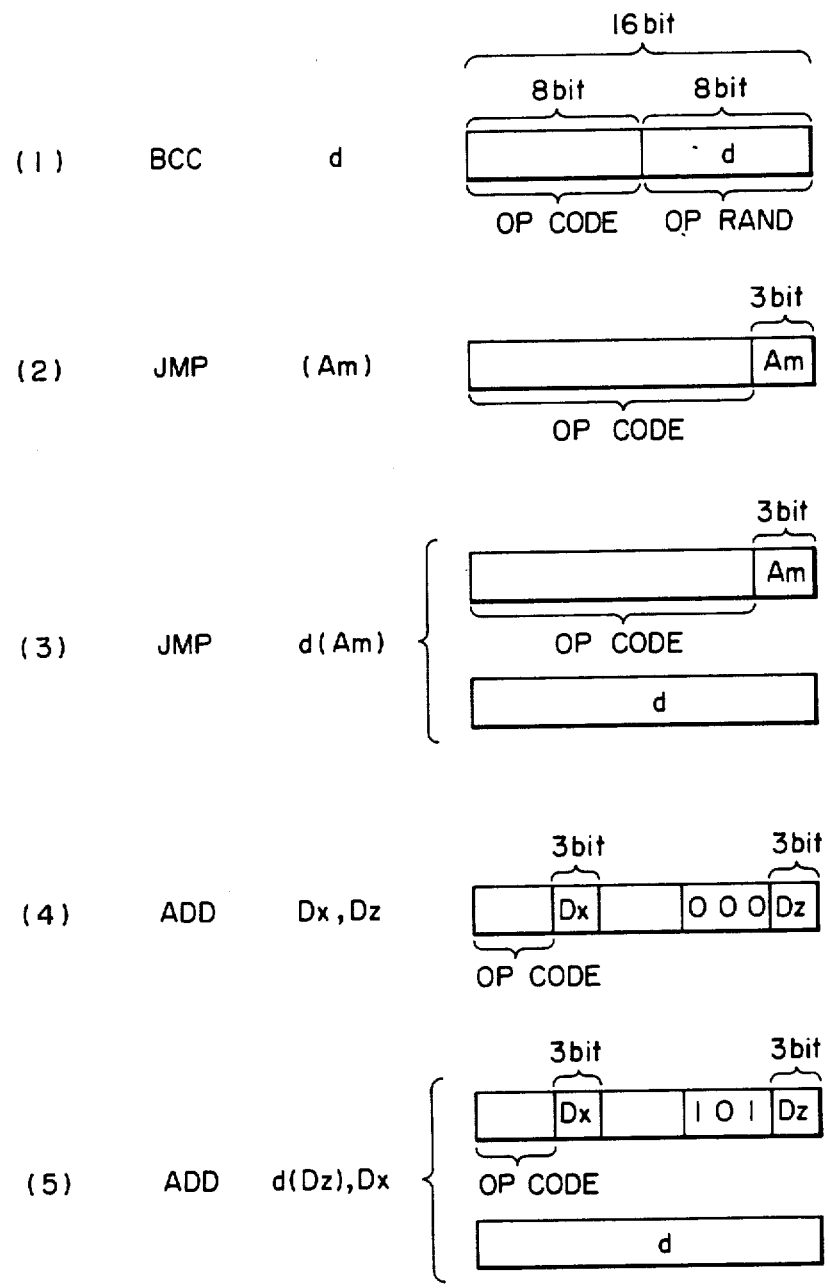
FIG. 8 is a diagram showing examples of instructions.

FIG. 8 exemplifies the mnemonic expressions and the codes of instructions for use in the present apparatus. An instruction indicated at (1) is an instruction of conditional branch BCC to an address obtained by adding the value of data d (8 bits) and the value of the register 42 if a condition is met. An instruction indicated at (2) is an instruction of jump to the target address of a branch instruction which is the content of one of the general-purpose registers 46 specified by register No. $A_m$. An instruction (3) is an instruction of jump to an address obtained by adding the content of one of the general-purpose registers 46 specified by register No. $A_m$ (3 bits) and the data d of the next address. An instruction (4) is an instruction which adds the contents of two of the general-purpose registers 46 specified by register Nos. $D_x$ and $D_y$, and which stores the added result in the general-purpose register specified by register No. $D_x$.

An instruction (5) is an instruction which adds the content of one of the general-purpose registers 46 specified by register No. $D_y$ and the data d (16 bits) of the next address, which reads out data using the added result as the address of the main storage 5, and which adds the read out data and the content of one of the general-purpose registers 46 specified by register No. $D_x$ and then stores the result in the register of register No. $D_x$.

Now, the operation of the present apparatus will be described with reference to timing charts.

Figure 9:
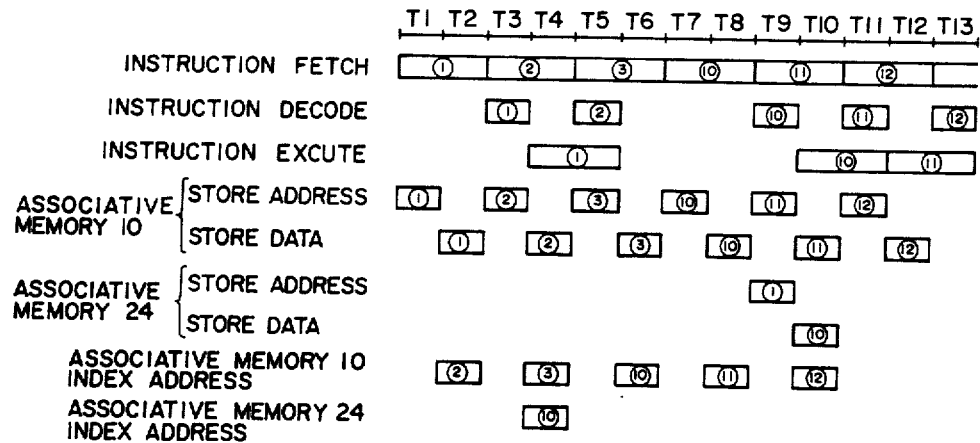
FIGS. 9 and 10 are timing charts of instruction processes in FIG. 7.

The timing chart of FIG. 9 illustrates the operation in the case where a conditional branch instruction ①, for example, the instruction (1) in FIG. 8 is first executed in the arrangement of FIG. 7.

In the ensuing description, instructions ①, ② and ③ shall be stored in the main storage 5 at successive addresses in the order mentioned. Besides, instructions ⑩, ⑪ and ⑫ shall be stored in the main storage 5 at successive addresses in the order mentioned. The instructions ①, ② and ③ and those ⑩, ⑪ and 12 shall generally have addresses which do not succeed each other.

The address of the branch instruction ① is computed by the adder 31, and is sent to the associative memory 10. In a case where the branch instruction ① has never been fetched, the instruction of the corresponding address is not stored in the associative memory 10, and hence, the signal 204 indicative of the result of index turns 'off'.

(1) CYCLE $T_1$

The control circuit 13 outputs the instruction fetch request signal 205 to the main storage 5 because the signal 204 is 'off'. The address 220 of the branch instruction ① is applied from the register 28 to the main storage 5.

The address of the branch instruction ① sent to the associative memory 10 is written into the index field of the associative memory 10 in accordance with the entry number 203 specified by the counter 12.

(2) CYCLE $T_2$

The control circuit 13 having received the instruction fetch end request signal 206 from the main storage 5 causes the selector 11 to output the data 200 of the fetched branch instruction① as the signal 202.

The memory 20 writes the signal 202 therein. The counter 271 within the control circuit 27 assumes '1' because the branch instruction ① has been stored.

The data 200 of the fetched branch instruction ① is written into the data field of the associative memory 10 in accordance with the entry number 203 specified by the counter 12. The counter 12 is thereafter incremented by 1 automatically.

That is, the branch instruction ① and its address are stored in the same entry of the associative memory 10.

On the other hand, the adder 31 computes the address of the next instruction ② and applies the computed result to the associative memory 10 as the signal 219. The associative memory 10 is accessed by the signal 219. Also in this case, the signal 204 turns 'off' because the instruction ② has not been written.

(3) CYCLE $T_3$

Since the memory 20 has empty areas, the address of the instruction ② computed by the adder 31 in advance is set in the register 28, and the instruction fetch request 223 is output.

When the control circuit 13 receives the instruction fetch request signal 223 with the signal 204 being in the 'off' status, it decides the necessity of the fetch of the instruction ② from the main storage 5 and outputs the instruction fetch request signal 205. Simultaneously, the signal 219 (the address of the instruction 2) is written into the index field of the associative memory 10 in accordance with the entry number specified by the counter 12.

Meanwhile, the branch instruction ① is fetched from the memory 20 and decoded by the instruction decoder 21. As a result, the branch instruction ① is found to be a conditional branch instruction BCC. Since the memory 20 becomes empty, the counter 271 in the control circuit 27 assumes '0'. Control information which is the decoded as a result of the instruction 1 is stored in the register 32 through the selector 25. In addition, the instruction itself is stored in the register 33.

(4) CYCLE $T_4$

The control information decoded by the instruction decoder 21 in the cycle $T_3$ is sent to the instruction execute unit 3. The control information is set in the timing control circuit 50, and is output to the ALU 48, the general-purpose registers 46 and the interface circuit 49 as control signals at predetermined timings, respectively. Specifically, the portion of the data d of the branch instruction ① and the content of the register 42 are respectively fed into the ALU 48 through the data buses 301 and 302 and are added, and the result is output to the data bus 303. In such sequence, the timing control circuit 50 outputs the control information till the end of the next cycle $T_5$. When starting the execution of the instruction, the address of the branch instruction ① previously computed by the adder 43 is set in the register 42 through the selector 40. The output signal 241 of the register 42 is connected to the index input of the associative memory 24. Since, however, the branch instruction ① is executed first, there is no corresponding entry, and the signal 218 is turned 'off'.

Meantime, the fetching of the instruction ② ends, and data is written into the memory 20 and the data field of the associative memory 10.

The address of an instruction ③ is computed by the adder 31, and the associative memory 10 is accessed with this address. The signal 204 is 'off' because of no entry.

The fetched instruction ② is written into the memory 20 as the signal 202. Thus, the counter 271 in the control circuit 27 stores '1'.

(5) CYCLE $T_5$

The instruction ② is output from the memory 20, and is decoded. Besides, the address of the instruction ③ is written into the index field of the associative memory 10 in accordance with the entry number of the counter 12.

In the cycle $T_5$, the executed result of the branch instruction ① is obtained. In consequence, the address of a target instruction of branch ⑩ is applied from the data bus 303 to the selectors 29 and 40 as the target address of branch signal 243. Here, the target instruction of branch ⑩ is assumed the instruction indicated at (4) in FIG. 8.

Since the target address of branch instruction has been obtained, the ALU 48 turns 'on' the next instruction request signal 244 in order to execute the next instruction. The branch signal 245 is applied from the ALU 48 to the control circuit 27. The control circuit 27 having received this branch signal 245 clears the content of the memory 20. Regarding the instruction ③ presently in the course of fetch, it is controlled by the control circuit 27 so that it may not be stored into the memory 20 even when fetched from the main storage 5.

When the control circuit 27 of the instruction control unit 2 receives the branch signal 245 with the signal 218 being in the 'off' status, it judges that the decoded result of the instruction ⑩ (FIG. 8, (4)) is not contained in the associative memory 24, and in order to stop the instruction execute unit 3, it turns 'on' the instruction execution inhibit signal 225 so as to inhibit the timing control circuit 50 from generating its signals. Further, the output signal 222 of the constant generator circuit 30 is rendered '0'.

Since the signal 218 is 'off' and the signal 245 is 'on', the control circuit 27 judges that there is no executable instruction in the memory 20 and the registers 32 and 33, and it outputs the instruction fetch request 223.

At the beginning of the cycle T₅, the signal 223 is 'on' and the signal 204 is 'off', so that the instruction fetch request 205 concerning the instruction ③ is sent to the main storage 5 by the control circuit 13.

(6) CYCLE T₆

The addition between the output '0' of the constant generator circuit 30 and the target address of the branch instruction sent via the selector 29 is performed by the adder 31. The output signal 219 of the adder 31 is set in the register 28 as the address of the instruction to be fetched next (instruction ⑩ ), and the instruction fetch request signal 223 is output. Since the instruction ⑩ (FIG. 8, (4)) has not been fetched before, the signal 204 which results from accessing memory 10 with the output signal 219 (the address of the instruction 10) of the adder 31 turns 'off'.

When the fetch of the instruction ③ from the main storage 5 ends, this instruction ③ is output as the signal 202 and is written into the associative memory 10. However, the signal 202 is not stored into the memory 20.

(7) CYCLE T₇

Since the signal 204 is 'off', the control circuit 13 of the interface circuit 4 outputs the instruction fetch request signal 205 so as to request the main storage 5 to fetch the instruction ⑩ .

At this time, the address of the instruction ⑩ is written into the associative memory 10.

The control circuit 13 brings the output of the constant generator circuit 30 back to '1'.

Although it is useless to decode the instruction ③ regarding status, it is executed according to a predetermined control sequence.

(8) CYCLE T₈

When the instruction fetch end signal 206 is received from the main storage 5 as to the instruction ⑩ (FIG. 8, (4)), the fetched instruction ⑩ is written into the associative memory 10 and is simultaneously sent to the memory 20 via the selector 11, and the instruction fetch end signal 224 is output to inform the control circuit 27 of the status.

The adder 31 computes the address of an instruction ⑪ , and the associative memory 10 is accessed with the address.

(9) CYCLE T₉

Upon receiving the branch signal 245, the control circuit 27 has cleared the memory 20 at the cycle T₅. Therefore, the instruction ⑩ is immediately sent to the instruction decoder 21, in which it is decoded to be an addition instruction (FIG. 8, (4)) and from which necessary control information is output. The decoded result is set in the register 32 via the selector 25 as the control information. Also the instruction ⑩ is set in the register 33. The address of the branch instruction ① indicated by the signal 241 is written into the index field of the associative memory 24 in accordance with the entry number 212 of the counter 23. The signal 241 remains indicating the address of the branch instruction ① because the instruction execute unit 3 has executed no instruction anew since the branch instruction ① is determined as a conditional branch instruction.

Since the signal 204 is 'off', the control circuit 13 supplies the main storage 5 with the instruction fetch request 205 concerning the instruction ⑪ . The address of the instruction ⑪ has already been computed by the adder 31 and stored in the register 28, and it is applied to the main storage 5 as the signal 220.

Besides, the address of the instruction ⑪ is stored in the associative memory 10.

(10) CYCLE T₁₀

The fetching of the instruction ⑪ from the main storage 5 is completed. Meanwhile, since preparations have been made for the execution of the instruction ⑩ (FIG. 8, (4)), the control circuit 27 turns 'off' the instruction execution inhibit signal 225 and starts the operation of the instruction execute unit 3.

More specifically, the control information 214 is set in the timing control circuit 50 and is output to the ALU 48 and the general-purpose registers 46 till the end of the next cycle T₁₁ at predetermined timings respectively.

At this time, the following sequence control is performed.

The contents of those of the general-purpose registers 46 specified by the operands $D_x$ and $D_y$ (signal 217) are respectively read out to the data buses 301 and 302, they are fed into and added by the ALU 48, and the added result is output to the data bus 303 and is fed into the register specified by the operand $D_x$.

In this way, the instruction is executed.

On the other hand, the decoded result 10 of the instruction ⑩ sent to the instruction execute unit 3 is written into a field A of the associative memory 24 and the instruction ⑩ is also written into a field B thereof and the counter 23 is incremented. That is, the address of the branch instruction ① and the decoded result and the content of the instruction ⑩ are stored in the identical entry number as an index address and as data.

This is because the operands are used for reading out data from the general-purpose registers 46.

The instruction ⑪ is stored into the associative memory 10, and the associative memory 10 is accessed with the address of the instruction ⑫ evaluated by the adder 31.

(11) CYCLE T₁₁

When the execution of the instruction ⑩ is complete, the decoded result of the instruction ⑪ is ready as in the cycle T₃, and thereafter, instructions are executed successively without intermission.

As illustrated in FIG. 9, the associative memory 10 is accessed in the cycles T₂, T₄, T₆, T₈, T₁₀ . . . , to find that any of the instructions ②, ③, ⑩, ⑪, ⑫ . . . is not stored. Therefore, the instructions ①, ②, ③, ⑩, ⑪, ⑫ . . . are written in the respective cycles T₂, T₄, T₆, T₈, T₁₀, T₁₂. . . . It is assumed that the instruction ① has been accessed before the cycle T₁. The associative memory 24 is also accessed in the cycle T₄. Since, however, the target instruction of branch ⑩ is not stored, it is written in the cycle T₁₀.

Next, a case of executing these instructions at the second time et seq. will be described with reference to FIG. 10.

(1) CYCLE T₁

Since the branch instruction ① has already been stored in the associative memory 10, the fetching of this branch instruction ① is completed in the cycle T₁. The branch instruction ① read from the associative memory 10 is stored in the memory 20 through the selector 11.

The counter 271 of the control circuit 27 stores '1'.

In case of reading the instruction out of the associative memory 10, in order to read the data field, the fetch request by the signal 223 is output, and simultaneously, the end is reported by the signal 224. Therefore, the computation of the next instruction address is not in time, and the fetch request is made every second cycle.

The signal 204 is 'on' because the corresponding entry is contained in the associative memory 10. The branch instruction ① is not written into the associative memory 10 again.

(2) CYCLE T₂

The decoding of the instruction ① is completed by the instruction decoder 21. The decoded result is sent to the instruction execute unit 3 via the selector 25 and the register 32 as the signals 211 and 214.

Since the signal 204 is 'on', the control circuit 13 does not supply the main storage 5 with the instruction fetch request 205 concerning the instruction ①.

The associative memory 10 is accessed by the address of the instruction②

(3) CYCLE T₃

During the execution of the branch instruction ① by the instruction execute unit 3, the address of the instruction ① to be executed is stored into the register 42. The associative memory 24 is accessed using the address of the branch instruction ① stored in the register 42.

Meanwhile, the adder 31 computes the address of the next instruction ②, and the access to the associative memory 10 is performed with this address. Since the instruction ② has already been stored in the associative memory 10, it is immediately read out and stored into the memory 20. Thus, '1' is stored into the counter 271.

(4) CYCLE T₄

The instruction ② stored in the memory 20 is decoded.

The branch instruction ① is executed, and the next instruction request signal 224, the branch signal 245, and the branch address signal 243 indicative of the address of the target instruction of branch ⑩ are output.

Because the corresponding entry is found, the signal 218 turns 'on', and the values of the data field of a target instruction of branch 10 are output to the signals 213 and 216.

Here, the "values of the data field" are the decoded result of the target instruction of branch 10 and the target instruction of branch 10 itself. At this time, the signal 218 turns 'on' because of the presence of the corresponding entry.

Since the signal 218 is 'on', the control circuit 27 operates upon receiving the branch signal 245 so as to transfer the signals 213 and 216 to the instruction execute unit 3 via the selectors 25, 26 and the registers 32, 33, respectively. In the case where the branch signal 245 is output and where the signal 218 is 'on' the output of the constant generator circuit 30 remains at '1' without becoming '0'.

In addition, the control circuit 27 clears the memory 20 in accordance with the branch signal 245.

On the other hand, when the branch signal 245 is not output, the instruction ② stored in the memory 20 is completely decoded by the instruction decoder 21 simultaneously with the completion of the execution of the branch instruction ①. Therefore, the control circuit 27 can supply the instruction execute unit 3 with the decoded result of the instruction ② and the instruction ② itself by the selectors 32 and 33 in the next cycle T₅ so as to execute the instruction.

For this reason, any execution stop cycle does not arise between the re-execution of the branch instruction and the execution of the target instruction.

(5) CYCLE T₅

When the branch signal 245 is output, the control information of the instruction ⑩ is immediately made up. Therefore, the instruction execution inhibit signal 225 is not turned 'on', and the instruction ⑩ is executed without any execution stop cycle. Since, in this case, the signal 223 is kept 'off' by the control circuit 27, the target instruction of branch is not fetched.

A '1' is output from the constant generator circuit 30, and the address of the target instruction of branch instruction ⑩ is input to the adder 31 through the selector 29, so that the address of an instruction ⑪ is output as the output signal 219 of the adder 31.

(6) CYCLE T₆

The execution of the instruction ⑩ is completed. The decoding of the instruction ⑪ ends at the same time the instruction execution inhibit signal 225 is turned "off". That is, the instruction ⑪ can be executed in cycles T₇ and T₈.

In this embodiment, when the target instruction of branch instruction ⑩ exists in the associative memory 24, the address of the next instruction ⑪ is computed by the use of the adder 31.

Figure 11:
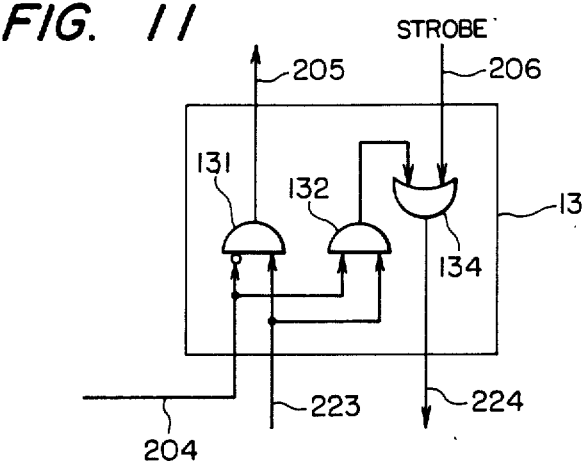
FIG. 11 is a connection diagram of a control circuit in FIG. 7.

FIG. 11 shows the internal circuit of the control circuit 13.

Numerals 131 and 132 designate AND circuits, and numeral 134 an OR circuit.

In the presence of the corresponding entry in the associative memory 10, the signal 204 assumes '1', and subject to the instruction fetch request signal 223 being '1', the instruction fetched end signal 224 is output through the AND circuit 132 as well as the OR circuit 134. In contrast, in the absence of the corresponding entry in the associative memory 10, the signal 204 assumes '0', and subject to the instruction fetch request signal 223 being '1', the instruction fetch request 205 is output to the main storage 5 through the AND circuit 131. When the instruction fetched from the main storage 5 ends, the instruction fetch end signal 206 is passed through the OR circuit 134 and is output as the signal 234.

Figure 12:
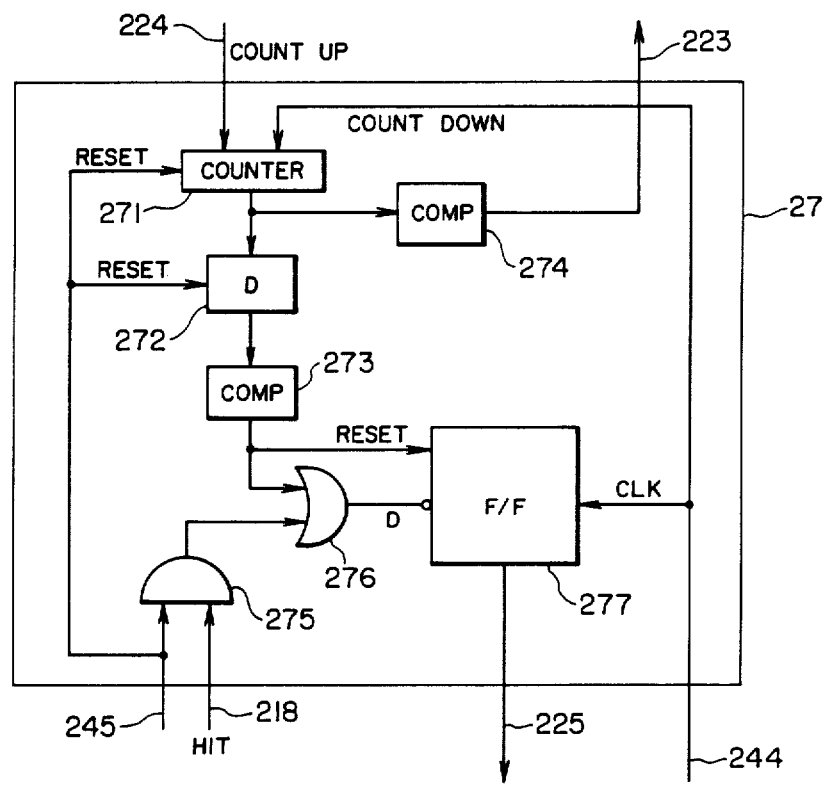
FIG. 12 is a connection diagram of another control circuit in FIG. 7.

FIG. 12 shows the internal circuit of the control circuit 27.

Numeral 271 designates the counter, numeral 272 a circuit for delaying its input by one cycle, numerals 273 and 274 comparators, numeral 275 an AND circuit, numeral 276 an OR circuit, and numeral 277 a flip-flop.

In a case where the corresponding entry exists in the associative memory 24 and where the branch request 245 is '1', the signal 218 assumes '1', and '1' is applied to the D terminal of the flip-flop 277 through the AND circuit 275 as well as the OR circuit 276. In accordance with the next instruction request signal 244, the inverted signal '0' of '1' at the D terminal is fed in to turn 'off' the execution inhibit signal 225. In addition, the counter 271 is reset.

In a case where the corresponding entry does not exist in the associative memory 24 and where the branch request signal is '0', the value of the counter 271 one cycle ago is fed from the delay circuit 272 into the comparator 273. The comparator 273 outputs '1' when the received value is greater than a preset value, and outputs '0' at any other time. The provision of the delay circuit 272 is based on the fact that one cycle is required for decoding an instruction by means of the instruction decoder 21. The output of the comparator 273 is applied to the D terminal through the OR circuit 276, and the inverted signal thereof is fed into the flip-flop 277 in response to the next instruction request signal 244.

When the received value of the comparator 273 is smaller than or equal to the preset value thereof, it is indicated that the instruction has not been decoded by the instruction decoder 21. Therefore, the execution inhibit signal 225 turns 'on'.

In a case where the corresponding entry does not exist in the associative memory 24 and where the branch request signal is '1', the counter 271 and the delay circuit 272 are reset. Consequently, the comparator 273 receives an input smaller than its preset value and accordingly outputs '0'. In response to the next instruction request signal 244, therefore, the flip-flop 277 is fed with the inverted signal '1' to turn 'on' the execution inhibit signal 225.

The counter 271 counts up in accordance with the instruction fetch end signal 224 from the control circuit 13, and counts down in accordance with the next instruction request signal 244. In this way, the counter 271 holds the number of instructions stored in the memory 20.

The comparator 274 checks whether or not the value of the counter 271 is smaller than the preset value. When the former value is smaller than the latter value, the comparator decides that the memory 20 has an empty area yet, and it turns 'on' the instruction fetch request signal 223.

When '1' is output from the comparator 273 with the flip-flop 225 turning 'on' the execution inhibit signal 225, it is indicated that the instruction to be subsequently executed has been decoded, and hence, the flip-flop 225 is reset.

Figure 13:
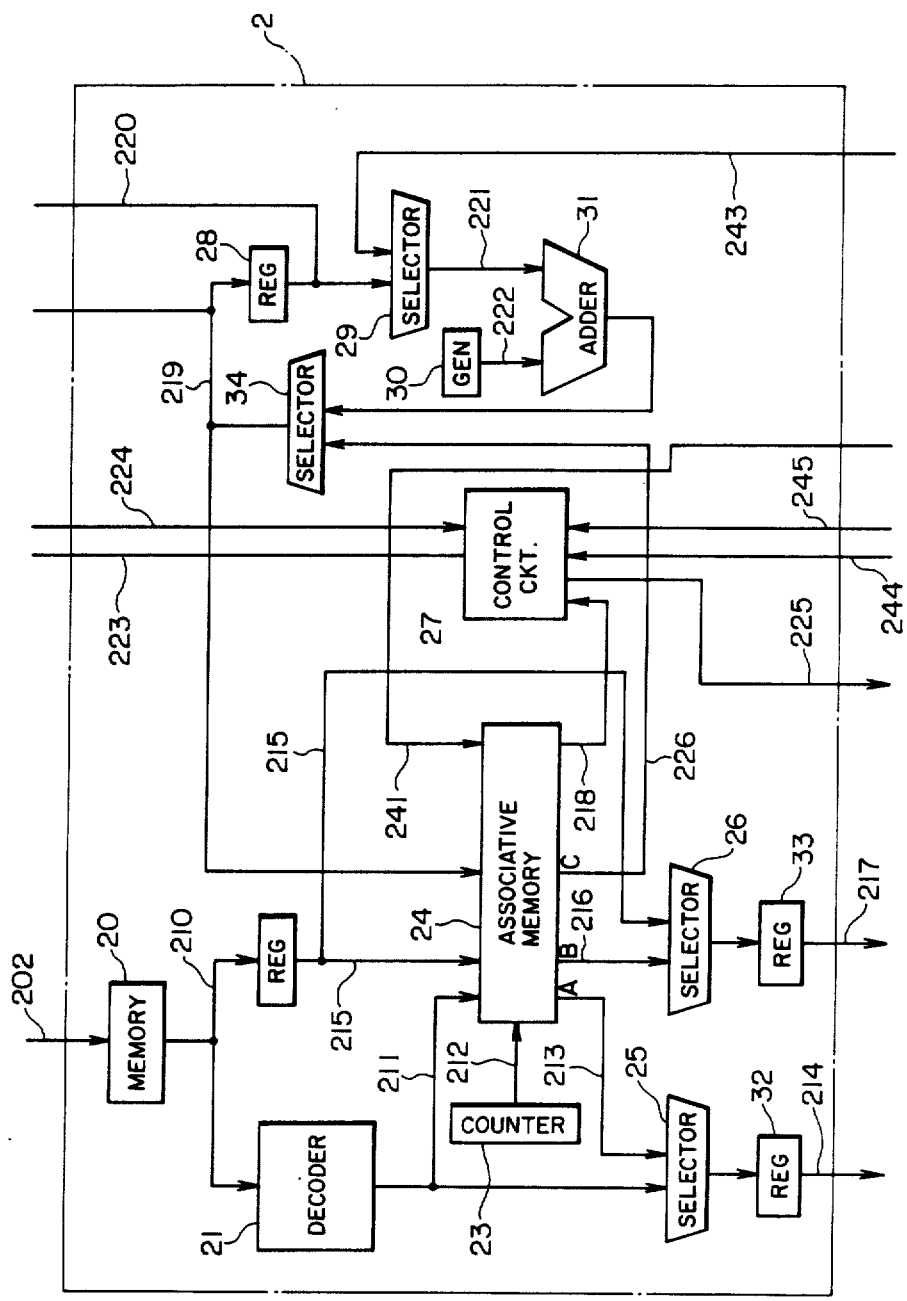
FIGS. 13 and 14 are diagrams each showing another embodiment of the present invention.

In contrast, in an embodiment shown in FIG. 13, the data field of the associative memory 24 is provided with a field C for storing the address of the instruction (11) next to the target instruction of branch instruction (10), and when executing the branch instruction, the address of the stored instruction (11) is sent to the interface circuit 4. When compared with the circuit of FIG. 7, the circuit of FIG. 13 further comprises a selector 34 which selects the address from the associative memory 24 and the address from the adder 31.

Figure 10:
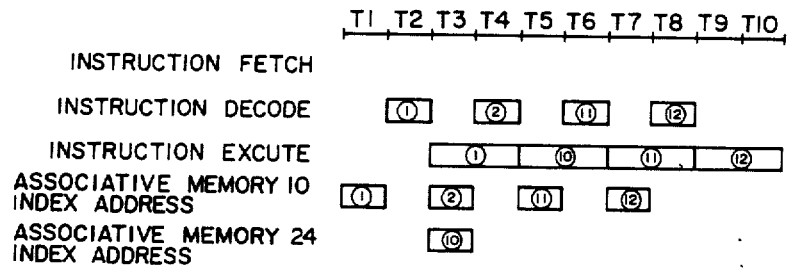

The operation of the embodiment of FIG. 13 is basically the same as that of the circuit of FIG. 7, except the cycle $T_8$ shown in FIG. 9 and the cycles $T_3$ and $T_4$ shown in FIG. 10.

(1) CYCLE $T_8$ IN FIG. 9

When the control circuit 13 receives the instruction fetch end signal 206 from the main storage 5 concerning the instruction (10), it writes the fetched instruction (10) into the associative memory 10 and simultaneously sends it to the memory 20 via the slector 11, and it outputs the signal 224 to inform the control circuit 27 of the status.

The adder 31 computes the address of the instruction (11), and the associative memory 10 is accessed with this address 11. Further, the address is written into the entry number of the associative memory 24 indicated by the counter 23.

Into the same entry of the associative memory 24, the address of the branch instruction (1) is stored in the cycle $T_9$, and the decoded result 10 and the content of the target instruction of branch (10) in the cycle $T_9$.

(2) CYCLE $T_3$ IN FIG. 10

During the execution of the branch instruction (1) is started by the instruction execute unit 3, and the address of the instruction (1) is stored in the register 42. The associative memory 24 is acessed using the address of the branch instruction (1) stored in the register 42.

(3) CYCLE $T_4$ IN FIG. 10

The instruction (2) stored in the memory 20 is decoded.

The branch instruction (1) is executed, whereupon the next instruction request signal 244, the branch signal 245, and the branch address signal 243 indicative of the address of the target instruction of branch (10) are output.

When the corresponding entry is found, the signal 218 is turned 'on', and the values of the data fields A, B and C of the associative memory 24 are output as the signals 213, 216 and 226.

Here, the "values of the data field" are the decoded result 10 of the target instruction of branch instruction 10, the target instruction of branch instruction 10 itself and the address 11 of the instruction 11. On this decision, the signal 218 turns 'on' owing to the presence of the corresponding entry.

Since the signal 218 is 'on', the control circuit 27 operates upon receiving the branch signal 245 so as to transfer the signals 213 and 216 to the instruction execute unit 3 via the selectors 25, 26 and the registers 32, 33 respectively.

In the case where the branch signal 245 is output and where the signal 218 is 'on', the output of the constant generator circuit 30 remains at '1' without assuming '0'.

In addition, the control circuit 27 clears the memory 20 in accordance with the branch signal 245.

The control circuit 27 controls the selector 34 so as to select the signal 226 because the signal 218 is 'on'.

The address of the instruction ⑪ read out from the field C of associative memory 24 in the cycle $T_3$ is applied to the index field of the associative memory 10 through the selector 34. The associative memory 10 is accessed with the address of the instruction ⑪, and the instruction ⑪ is stored into the memory 20.

In this manner, according to the embodiment of FIG. 13, the computing period of time by the adder 31 can be omitted to shorten the access time to the associative memory 10. That is, unlike the circuit of FIG. 7, this embodiment can request the associative memory 10 to read out the data in the same cycle as that of the next instruction request signal 244 as well as the branch signal 245. No additional idle time is occurred between the instructions 10 and 11.

Figure 14:
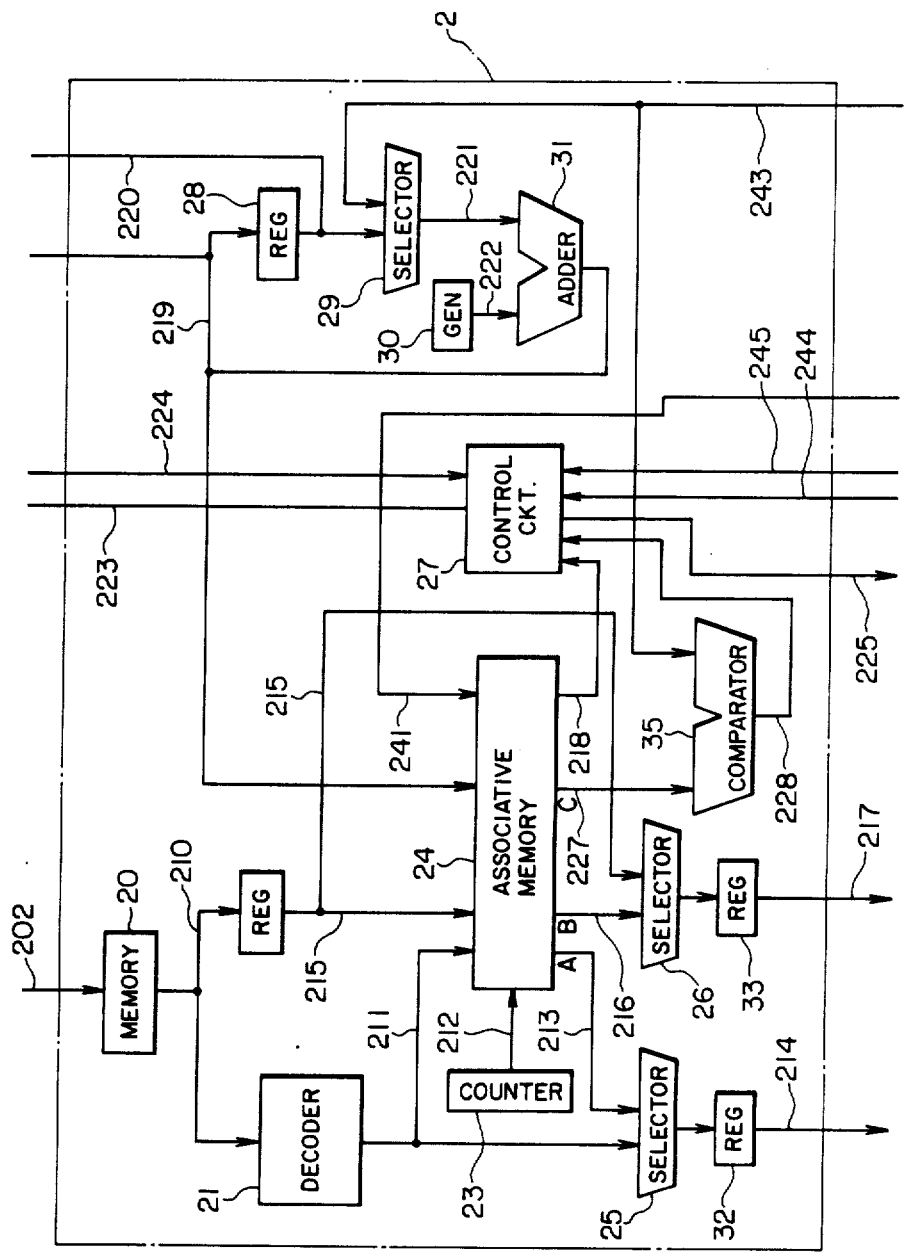

In order to effectively operate even for a branch instructions (2) and (3) in FIG. 8 whose target address of branch are generated by the general register 46, an embodiment in FIG. 14 comprises, beside the circuit of FIG. 7, a field which is provided in the associative memory 24 for storing the target addresses of branch, and a comparator 35 which compares the branch address signal 243 and the target address of branch stored in the associative memory 24.

The "branch instruction whose target address of branch is generated by general register 46" is intended to mean an instruction (for example, (2) in FIG. 8) whose target address of branch is determined by referring to the content of a register (46 in FIG. 7) specified by an operand within the instruction, the content of this register being alterable with another instruction.

The operation of the embodiment of FIG. 14 is basically the same as that of the circuit of FIG. 7, except the cycle $T_6$ shown in FIG. 9 and the cycles $T_3$ and $T_4$ shown in FIG. 10.

(1) CYCLE $T_6$ IN FIG. 9

The output of the constant generator circuit 30 assumes '0', and is added by the adder 31 with the target address 10 of branch sent via the selector 29. The output signal 219 of the adder 31 is stored into the data field C of the associative memory 24 specified by the counter 23 and is simultaneously set into the register 28 as the address of the instruction ⑩ to be subsequently fetched from the main storage 5, whereupon the instruction fetch request signal 223 is output.

Since the instruction ⑩ has not been fetched before, the signal 204 which results from accessing the associative memory 10 with the output signal 219 of the adder 31 turns 'off'.

The fetch of the instruction ③ from the main storage 5 ends, and this instruction ③ is output as the signal 202, which is written into the associative memory 10. However, the signal 202 is not stored into the memory 20.

(2) CYCLE $T_3$ IN FIG. 10

During the execution of the branch instruction ① is started by the instruction execute unit 3, the address of the instruction ① to be executed is stored in the register 42. The associative memory 24 is accessed using the address of the branch instruction ① stored in the register 42.

(3) CYCLE $T_4$ IN FIG. 10

The instruction ② stored in the memory 20 is decoded.

The branch instruction ① is executed, whereupon the next instruction request signal 244, the branch signal 245, and the branch address signal 243 indicative of the address of the target instruction of branch ⑩ are output.

The comparator 35 compares the address of the target instruction of branch ⑩ read out from the associative memory 24 in the cycle $T_3$ and the branch address signal 243. When the coincidence is detected, it is reported to the control circuit 27 by turning 'on' the signal 228.

When the corresponding entry is found, the signal 218 turns 'on', the values of the data fields A, B and C of the associative memory 24 are output as the signals 213, 216 and 227.

Here, the values of the data fields are the decoded result of the target instruction of branch 10, the target instruction of branch 10 itself, and the address of the instruction 10. On this occasion, the signal 218 turns 'on' owing to the presence of the corresponding entry.

Since the signals 218 and 228 are 'on', the control circuit 27 operates upon receiving the branch signal 245 so as to transfer the signals 213 and 216 to the instruction execute unit 3 via the selectors 25, 26 and the registers 32, 33 respecitvely.

In the case where the branch signal 245 is output and where the signals 218 and 228 are 'on', the output of the constant generator circuit 30 remains at '1' without assuming '0'. In addition, the control circuit 27 clears the memory 20 in accordance with the branch signal 245.

On the other hand, in a case where the coincidence is not detected in the comparator 35, the signal 228 turns 'off'. Since the signal 228 is 'off', the control circuit 27 turns 'on' the instruction execution inhibit signal 225 to inhibit the instruction execute unit 3 from executing an instruction. This function is realized in the control circuit 27 by subjecting the signals 228 and 218 to logic OR and inputing the result to the AND circuit 275 (FIG. 12). No additional idle time is occurred between the instructions 10 and 11.

Thereafter, the embodiment of FIG. 9 operates as in the cycle $T_6$ et seq. in FIG. 9.

According to this embodiment, the invention is also applicable to an instruction whose target address is not uniquely determined by the address of a branch instruction.

In the above embodiments of FIGS. 7, 13 and 14, the associative memories 10 and 24 are used for deciding the presence or absence of instructions. Since they are structurally regular as compared with a decision circuit composed of an arithmetic unit, a comparator etc., the density of integration can be enhanced in cases of a microprocessor etc. which are realized with ICs.

What is claimed is:

1. A data processing apparatus comprising:
   a main storage in which instructions to be executed are stored;
   means, coupled to the main storage, for fetching instructions from said main storage;
   decoding and generating means, coupled to the means for fetching, for decoding the instructions fetched by the means for fetching and for generating control information for executing the instructions;

means, coupled to the decoding and generating means, for executing the instructions in response to the control information generated by the decoding and generating means;

said means for fetching, said means for decoding and generating, and said means for executing operating in parallel to perform pipeline data processing; and said decoding and generating means including a first memory for storing said control information, obtained from said decoding and generating means by decoding a target instruction accessed by a target address obtained from a branch instruction, for storing content of the target instruction, and for storing an address of said branch instruction, said first memory stores said control information, said content of said target instruction and said address of said branch instruction before re-executing the branch instruction, said first memory further includes means for reading out said control information and said content of the target instruction in response to the address of said branch instruction, and for sending said read out control information and said read out content of the target instruction to said means for executing without an additional fetch of the target instruction from said main storage when re-executing the branch instruction.

2. A data processing apparatus in accordance with claim 1 wherein said first memory is an associative memory, the control information and the content of the target instruction are written in data fields of the associative memory, the address of the branch instruction is written in an index field of the associative memory and wherein the control information, the content of the target instruction and the address of the branch instruction are written into the associative memory by a single entry number.

3. A data processing apparatus in accordance with claim 1, wherein said decoding and generating means includes means for sending a signal for requesting an instruction to be decoded to said means for fetching when said first memory has been accessed with the address of a branch instruction and no address of the branch instruction exists in the first memory, and said means for sending a signal does not send a signal when said first memory has been accessed with the address of the branch instruction and the address of the branch instruction exists therein.

4. A data processing apparatus in accordance with claim 1, wherein said means for executing executes said target instruction according to the control information stored in said first memory.

5. A data processing apparatus in accordance with claim 1, wherein said means for fetching further includes:

a second memory for storing a plurality of instructions and a plurality of addresses corresponding to said plurality of instructions.

6. A data processing apparatus comprising:

a main storage in which instructions to be executed are stored;

means, coupled to the main storage, for fetching instructions from said main storage;

decoding and generating means, coupled to the means for fetching, for decoding the instructions fetched by the means for fetching and for generating control information for executing the instructions;

means, coupled to the decoding and generating means, for executing the instructions in response to the control information generated by the decoding and generating means;

said means for fetching, said means for decoding and generating, and said means for executing operating in parallel to perform pipeline data processing; and said decoding and generating means including a first memory for storing content of a target instruction accessed by a target address obtained from a branch instruction, for storing an address of an instruction immediately following the address of the target instruction, and for storing an address of said branch instruction, said first memory stores said content of said target instruction, said address of said instruction immediately following said target instruction and said address of said branch instruction before re-executing the branch instruction, said first memory further includes means for reading out said content of the target instruction and said address of said instruction immediately following said target instruction in response to the address of said branch instruction, for sending said read out content of the target instruction to said means for executing, and for sending said read out address of said instruction immediately following said target instruction to said means for fetching without an additional fetch of the target instruction from said main storage.

7. A data processing apparatus in accordance with claim 6, wherein said first memory is an associative memory, the content of the target instruction and the address of an instruction immediately following the address of the target instruction are written in data fields of the associative memory, the address of the branch instruction is written in an index field of the associative memory, and wherein the content of the target instruction, the address of the instruction immediately following the address of the target instruction are written into the associative memory by a single entry number.

8. A data processing apparatus in accordance with claim 6 wherein said decoding and generating means includes means for sending a signal for requesting an instruction to be decoded to said means for fetching when said first memory has been accessed with the address of a branch instruction and no address of the branch instruction exists in the first memory and said means for sending a signal does not send a signal when said first memory has been accessed with the address of the branch instruction and the address of the branch instruction exists therein.

9. A data processing apparatus in accordance with claim 6, wherein said first memory further stores control information, obtained by decoding said target instruction, and wherein said means for executing executes said target instruction according to the control information stored in the memory.

10. A data processing apparatus in accordance with claim 6, wherein said means for fetching further includes:

a second memory for storing a plurality of instructions and a plurality of addresses corresponding to said plurality of instructions.

11. A data processing apparatus comprising:

a main storage in which instructions to be executed are stored;

means, coupled to the main storage, for fetching instructions from said main storage;

decoding and generating means, coupled to the means for fetching, for decoding the instructions fetched by the means for fetching and for generating control information for executing the instructions;

means, coupled to the decoding and generating means, for executing the instructions in response to the control information generated by the decoding and generating means;

said means for fetching, said means for decoding and generating, and said means for executing operating in parallel to perform pipeline data processing; and said decoding and generating means including a first memory for storing said control information obtained from said decoding and generating means by decoding a target instruction accessed by a target address obtained from a branch instruction, for storing content of the target instruction, for storing the address of the target instruction, and for storing an address of said branch instruction, said first memory stores said control information, said content of said target instruction, said address of said target instruction and said address of said branch instruction before re-executing the branch instruction, said first memory further includes means for reading out said control information, said content of the target instruction and said address of said target instruction in response to the address of said branch instruction, and for sending said read out address of said target instruction to comparator means, said comparator means compares said read out address of said target instruction with an address of said target instruction generated from said means for executing, when a coincidence is detected by said comparator means said read out control information and said read out content of the target instruction are sent to said means for executing in response to an output of said comparator means without an additional fetch of the target instruction from the main storage when re-executing the branch instruction.

12. A data processing apparatus in accordance with claim 11, wherein said first memory is an associative memory, the control information, the content of the target instruction and the address of the target instruction are written in data fields of the associative memory, the address of the branch instruction is written in an index field of the associative memory, and wherein the control information, the content of the target instruction, the address of the target instruction and the address of the branch instruction are written into the associative memory by a single entry number.

13. A data processing apparatus in accordance with claim 11, wherein said decoding and generating means includes means for sending a signal for requesting an instruction to be decoded to said means for fetching when said first memory has been accessed with the address of a branch instruction and no address of the branch instruction exists in the first memory, and said means for sending a signal does not send a signal when said first memory has been accessed with the address of the branch instruction and the address of the branch instruction exists therein.

14. A data processing apparatus in accordance with claim 11, wherein said means for executing executes said target instruction according to the control information stored in said first memory.

15. A data processing apparatus in accordance with claim 11, wherein the address of the target instruction read out from said first memory is compared with an address of a next instruction calculated by said means for executing.

16. A data processing apparatus in accordance with claim 11, wherein said means for fetching further includes:

a second memory for storing a plurality of instructions and a plurality of addresses corresponding to said plurality of instructions.

17. A microprocessor for use with a main storage in a data processing system with instructions to be executed by the microprocessor being stored in the main storage, the microprocessor comprising:

means, coupled to the main storage, for fetching instructions from said main storage;

decoding and generating means, coupled to the means for fetching, for decoding the instructions fetched by the means for fetching and for generating control information for executing the instructions;

means, coupled to the decoding and generating means, for executing the instructions in response to the control information generated by the decoding and generating means;

said means for fetching, said means for decoding and generating, and said means for executing operating in parallel to perform pipeline data processing; and said decoding and generating means including a first memory for storing said control information, obtained from said decoding and generating means by decoding a target instruction accessed by a target address obtained from a branch instruction, for storing content of the target instruction, and for storing an address of said branch instruction, said first memory stores said control information, said content of said target instruction and said address of said branch instruction before re-executing the branch instruction, said first memory further includes means for reading out said control information and said content of the target instruction in response to the address of said branch instruction and for sending said read out control information and said read out content of the target instruction to said means for executing without an additional fetch of the target instruction from said main storage when re-executing the branch instruction.

18. A microprocessor in accordance with claim 17, wherein said first memory is an associative memory, the control information and the content of the target instruction are written in data fields of the associative memory, the address of the branch instruction is written in an index field of the associative memory, and wherein the control information, the content of the target instruction and the address of the branch instruction are written into the associative memory by a single entry number.

19. A microprocessor in accordance with claim 17, wherein said decoding and generating means includes means for sending a signal for requesting an instruction to be decoded to said means for fetching when said first memory has been accessed with the address of a branch instruction and no address of the branch instruction exists in the first memory and said means for sending a signal does not send a signal when said first memory has been accessed with the address of the branch instruction and the address of the branch instruction exists therein.

20. A microprocessor in accordance with claim 1, wherein said means for executing executes said target instruction according to the control information stored in said first memory.

21. A microprocessor in accordance with claim 17, wherein said means for fetching further includes:
a second memory for storing a plurality of instructions and a plurality of addresses corresponding to said plurality of instructions.

22. A microprocessor for use with a main storage in a data processing system with instructions to be executed by the microprocessor being stored in said main storage, said microprocessor comprising:
means, coupled to the main storage, for fetching instructions from said main storage;
decoding and generating means, coupled to the means for fetching, for decoding the instructions fetched by the means for fetching and for generating control information for executing the instructions;
means, coupled to the decoding and generating means, for executing the instructions in response to the control information generated by the decoding and generating means;
said means for fetching, said means for decoding and generating, and said means for executing operating in parallel to perform pipeline data processing; and
said decoding and generating means including a first memory for storing content of a target instruction accessed by a target address obtained from a branch instruction, for storing an address of an instruction immediately following the address of the target instruction, and for storing an address of said branch instruction, said first memory stores said content of said target instruction, said address of said instruction immediately following said target instruction and said address of said branch instruction before re-executing the branch instruction, said first memory further includes means for reading out said content of the target instruction and said address of said instruction immediately following said target instruction in response to the address of said branch instruction, for sending said read out content of the target instruction to said means for executing, and for sending said read out address of said instruction immediately following said target instruction to said means for fetching without an additional fetch of the target instruction from said main storage when re-executing the branch instruction.

23. A microprocessor in accordance with claim 22, wherein said first memory is an associative memory, the content of the target instruction and the address of an instruction immediately following the address of the target instruction are written in data fields of the associative memory, the address of the branch instruction is written in an index field of the associative memory, and wherein, the content of the target instruction, the address of the instruction immediately following the address of the target instruction and the address of the branch instruction are written into the associative memory by a single entry number.

24. A microprocessor in accordance with claim 22, wherein said decoding and generating means includes means for sending a signal for requesting an instruction to be decoded to said means for fetching when said first memory has been accessed with the address of a branch instruction and no address of the branch instruction exists in the first memory and said means for sending a signal does not send a signal when said first memory has been accessed with the address of the branch instruction and the address of the branch instruction exists therein.

25. A microprocessor in accordance with claim 27, wherein said first memory further stores control information, obtained by decoding said target instruction and wherein said means for executing executes said target instruction according to the control information stored in the first memory.

26. A microprocessor in accordance with claim 22, wherein said means for fetching further includes:
a second memory for storing a plurality of instructions and a plurality of addresses corresponding to said plurality of instructions.

27. A microprocessor for use with a main storage in a data processing system with instructions to be executed by the microprocessor being stored in said main storage, said microprocessor comprising:
means, coupled to the main storage, for fetching instructions from said main storage;
decoding and generating means, coupled to the means for fetching, for decoding the instructions fetched by the means for fetching and for generating control information for executing the instructions;
means, coupled to the decoding and generating means, for executing the instructions in response to the control information generated by the decoding and generating means;
said means for fetching, said means for decoding and generating, and the means for executing operating in parallel to perform pipeline data processing; and
said decoding and generating means including a first memory for storing said control information obtained from said decoding and generating means by decoding a target instruction accessed by a target address obtained from a branch instruction, for storing content of the target instruction, for storing the address of the target instruction, and for storing an address of said branch instruction, said first memory stores said control information, said content of said target instruction, said address of said target instruction and said address of said branch instruction before re-executing the branch instruction, said first memory further includes means for reading out said control information, said content of the target instruction and said address of said target instruction in response to the address of said branch instruction, and for sending said read out address of said target instruction to comparator means, said comparator means compares said read out address of said target instruction with an address of said target instruction generated from said means for executing, when a coincidence is detected by said comparator means, said read out control information and said read out content of the target instruction are sent to said means for executing in response to an output of said comparator means without an additional fetch of the target instruction from the main storage when re-executing the branch instruction.

28. A microprocessor in accordance with claim 27, wherein said first memory is an associative memory, the control information and the content of the target instruction are written in data fields of the associative memory, the address of the branch instruction is written in an index field of the associative memory, and wherein the control information, the content of the target instruction, the address of the target instruction and the address of the branch instruction are written into the associative memory by a single entry number.

29. A microprocessor in accordance with claim 27 wherein said decoding and generating means includes means for sending a signal for requesting an instruction to be decoded to said means for fetching when said first memory has been accessed with the address of a branch instruction and no address of the branch instruction exists in the first memory and said means for sending a signal does not send a signal when said first memory has been accessed with the address of the branch instruction and the address of the branch instruction exists therein.

30. A microprocessor in accordance with claim 27, wherein said means for executing executes target instruction according to the control information stored in said first memory.

31. A microprocessor in accordance with claim 28, wherein the address of the target instruction read out from said first memory is compared with an address of a next instruction calculated by said means for executing.

32. A microprocessor in accordance with claim 27, wherein said means for fetching further includes:
a second memory for storing a plurality of instructions and a plurality of addresses corresponding to said plurality of instructions.

* * * * *